(12) United States Patent
Kawaguchi

(10) Patent No.: US 11,321,035 B2
(45) Date of Patent: May 3, 2022

(54) INFORMATION PROCESSING APPARATUS, IMAGE PROCESSING PROGRAM, AND INFORMATION PROCESSING METHOD FOR ACQUIRING LOSS-INFORMATION

(71) Applicant: SEIKO EPSON CORPORATION, Tokyo (JP)

(72) Inventor: Yosuke Kawaguchi, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/176,872

(22) Filed: Feb. 16, 2021

(65) Prior Publication Data
US 2021/0255815 A1 Aug. 19, 2021

(30) Foreign Application Priority Data
Feb. 19, 2020 (JP) .............................. JP2020-026016

(51) Int. Cl.
*G06F 3/12* (2006.01)
*G06Q 30/02* (2012.01)

(52) U.S. Cl.
CPC ............ *G06F 3/1273* (2013.01); *G06F 3/121* (2013.01); *G06F 3/1207* (2013.01); *G06F 3/1219* (2013.01); *G06F 3/1229* (2013.01); *G06F 3/1291* (2013.01); *G06Q 30/0283* (2013.01)

(58) Field of Classification Search
None
See application file for complete search history.

(56) References Cited

U.S. PATENT DOCUMENTS

| | | | | |
|---|---|---|---|---|
| 2004/0233472 A1* | 11/2004 | Gassho | ................. | G06F 3/1207 358/1.15 |
| 2005/0275868 A1* | 12/2005 | Higashiura | ............ | G06K 15/00 358/1.14 |
| 2006/0088323 A1* | 4/2006 | Morisawa | .......... | G03G 15/5012 399/21 |
| 2007/0206219 A1* | 9/2007 | Yanagi | .................. | G06F 3/1204 358/1.15 |
| 2007/0273922 A1* | 11/2007 | Matsugashita | ........ | G06F 3/1207 358/1.15 |
| 2008/0172401 A1* | 7/2008 | Nishiyama | ............. | G06Q 10/10 |
| 2018/0147838 A1* | 5/2018 | Harayama | .............. | B33Y 50/02 |
| 2019/0079708 A1* | 3/2019 | Yamada | ................ | G06F 3/1263 |
| 2020/0382670 A1* | 12/2020 | Nakamoto | ......... | H04N 1/00676 |
| 2020/0406643 A1* | 12/2020 | Komazawa | .............. | B41J 11/42 |
| 2021/0067637 A1* | 3/2021 | Kubo | ................... | H04N 1/0097 |

FOREIGN PATENT DOCUMENTS

JP 2019-053347 4/2019

* cited by examiner

*Primary Examiner* — Henok Shiferaw
(74) *Attorney, Agent, or Firm* — Workman Nydegger

(57) ABSTRACT

An information processing apparatus includes a history-information acquiring section configured to acquire, from a plurality of printers, history information indicating an amount of use of printing media used for printing in the printers and size of a printing region in the printing media on which the printing is performed, a loss-information acquiring section configured to acquire, based on the history information, loss information indicating a non-printing region in each of the printing media, and an output control section configured to cause a display section to output the loss information for each of the printing media.

7 Claims, 8 Drawing Sheets

FIG. 3

| HI — HISTORY INFORMATION | | |
|---|---|---|
| JOB INFORMATION | JOB ID | |
| ERROR INFORMATION | ERROR ID | |
| PRINTING MEDIA SETTING INFORMATION | PRINTING MEDIA NAME | |
| | PRINTING MEDIA CONVEYANCE AMOUNT (m) | |
| | PRINTING MEDIA RESIDUAL AMOUNT | |
| | PRINTING MEDIA WIDTH (m) | |
| | SIZE OF PRINTING REGION | |
| | HEATER TEMPERATURE SETTING | |
| | MECHANICAL PARAMETERS | |
| SETTING ENVIRONMENT INFORMATION | TEMPERATURE | |
| | HUMIDITY | |
| | AIR PRESSURE | |

| JOB INFORMATION | JOB ID |
|---|---|
| ERROR INFORMATION | ERROR ID |
| PRINTING MEDIA SETTING INFORMATION | PRINTING MEDIA NAME |
| | PRINTING MEDIA CONVEYANCE AMOUNT (m) |
| | PRINTING MEDIA RESIDUAL AMOUNT |
| | PRINTING MEDIA WIDTH (m) |
| | SIZE OF PRINTING REGION |
| | HEATER TEMPERATURE SETTING |
| | MECHANICAL PARAMETERS |
| SETTING ENVIRONMENT INFORMATION | TEMPERATURE |
| | HUMIDITY |
| | AIR PRESSURE |

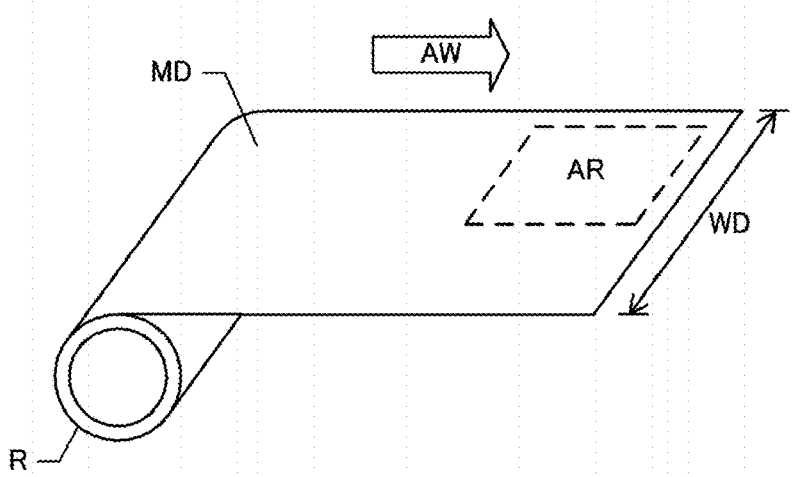

FIG. 8
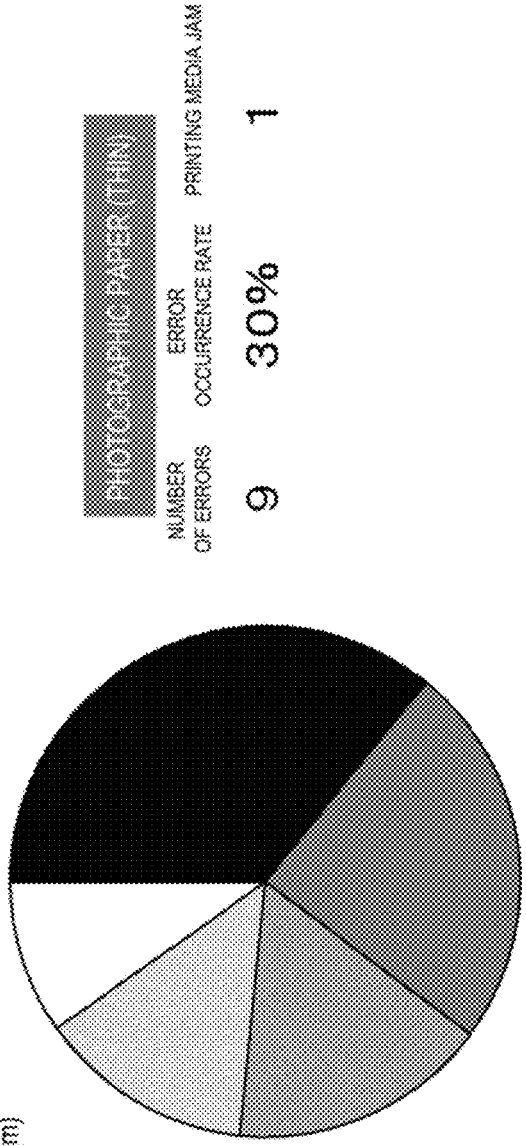
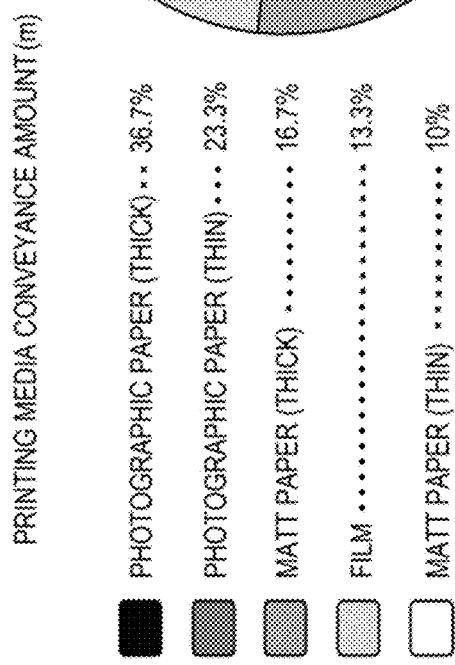

INFORMATION PROCESSING APPARATUS, IMAGE PROCESSING PROGRAM, AND INFORMATION PROCESSING METHOD FOR ACQUIRING LOSS-INFORMATION

The present application is based on, and claims priority from JP Application Serial Number 2020-026016, filed Feb. 19, 2020, the disclosure of which is hereby incorporated by reference herein in its entirety.

BACKGROUND

1. Technical Field

The present disclosure relates to an information processing apparatus, a non-transitory computer-readable storage medium storing an image processing program, and an information processing method.

2. Related Art

There has been known an information processing apparatus that supports work or processing for estimating a profit in a business type in which prints are used as commodities. JP-A-2019-53347 (Patent Literature 1) discloses an information processing apparatus that calculates cost of a printing job focusing on a media price and a consumption amount of printing media in cost required for printing and calculates an index value of a profit obtained by executing the printing job for a predetermined time. It has been known that such an index value is utilized in price setting in receiving orders.

In the related art explained above, it has been difficult to specify a loss, which is an amount of a non-printing region in each of the printing media involved in the execution of the printing job.

SUMMARY

An information processing apparatus according to an aspect of the present disclosure includes: a history-information acquiring section configured to acquire, from a plurality of printers, history information indicating an amount of use of printing media used for printing in the printers and a size of a printing region in the printing media on which the printing is performed; a loss-information acquiring section configured to acquire, based on the history information, loss information indicating a non-printing region in each of the printing media; and an output control section configured to cause a display section to output the loss information for each of the printing media.

An information processing program according to an aspect of the present disclosure causes a computer to function as: a history-information acquiring section configured to acquire, from a plurality of printers, history information indicating an amount of use of printing media used for printing in the printers and the size of a printing region in the printing media on which the printing is performed; a loss-information acquiring section configured to acquire, based on the history information, loss information indicating a non-printing region in each of the printing media; and an output control section configured to cause a display section to output the loss information for each of the printing media.

An information processing terminal according to an aspect of the present disclosure is an information processing terminal including a display section and a control section. The control section causes a display section to output, for each of printing media, loss information indicating a non-printing region in each of the printed media acquired based on history information indicating an amount of use of the printing media used for printing in a plurality of printers and the size of a printing region in the printing media on which the printing is performed.

An information processing method according to an aspect of the present disclosure includes: acquiring, from a plurality of printers, history information indicating an amount of use of printing media used for printing in the printers and the size of a printing region in the printing media on which the printing is performed; acquiring, based on the history information, loss information indicating a non-printing region in each of the printing media; and causing a display section to output the loss information for each of the printing media.

BRIEF DESCRIPTION OF THE DRAWINGS

FIG. 3 is a diagram showing history information.

FIG. 4 is a diagram for explaining information included in printing media setting information.

FIG. 8 is a diagram showing a display example of statistical information.

DESCRIPTION OF EXEMPLARY EMBODIMENTS

Embodiments of the present disclosure are explained according to order described below.
(1) System configuration
(1-1) Configuration of a printer
(1-2) Configuration of a mediating apparatus
(1-3) Configuration of an information processing apparatus
(1-4) Configuration of an information processing terminal
(2) History information transmission processing
(3) Information output processing
(4) Other embodiments

(1) System Configuration

Figure 1:
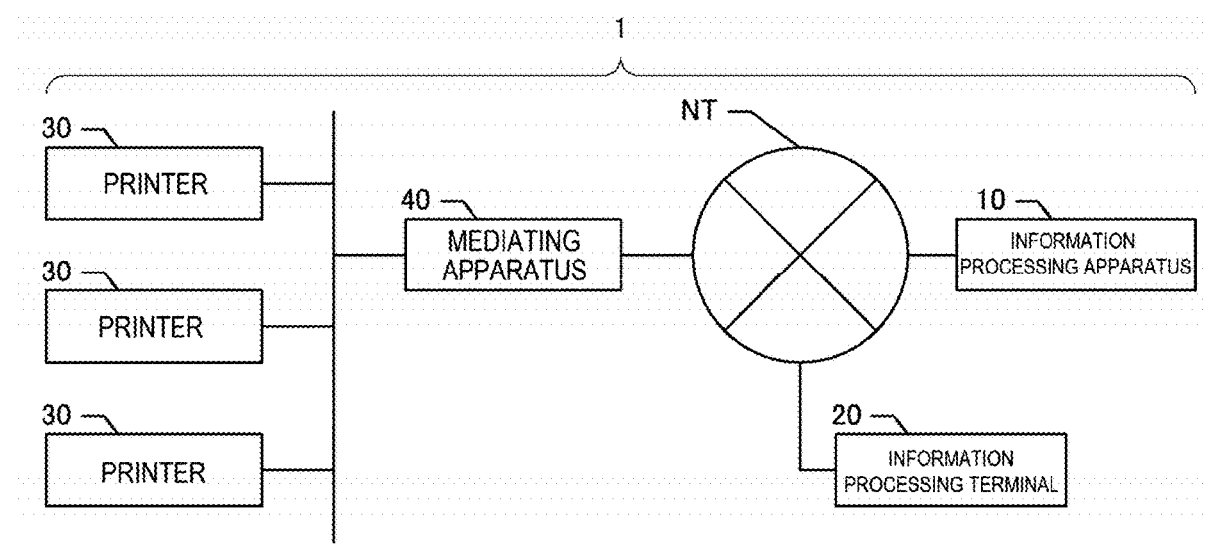
FIG. 1 is a block diagram showing an information collection system including an information processing apparatus.

FIG. 1 is a diagram schematically showing an example of an information collection system including an information processing apparatus. An information collection system 1 includes an information processing apparatus 10, an information processing terminal 20, a printer 30, and a mediating apparatus 40. In this embodiment, the information processing apparatus 10, the information processing terminal 20, and the mediating apparatus 40 are capable of communicating with one another via the Internet NT.

In this embodiment, the information processing apparatus 10 collects and records history information indicating a history of printing performed by the printer 30. The mediating apparatus 40 is coupled to a plurality of printers 30, acquires the history information collected in the printers 30, and transmits the history information to the information processing apparatus 10 via the Internet NT. The numbers of mediating apparatuses 40 and printers 30 are not limited. Different mediating apparatuses 40 may collect history information from each of printers 30 set in different facilities.

Figure 7:
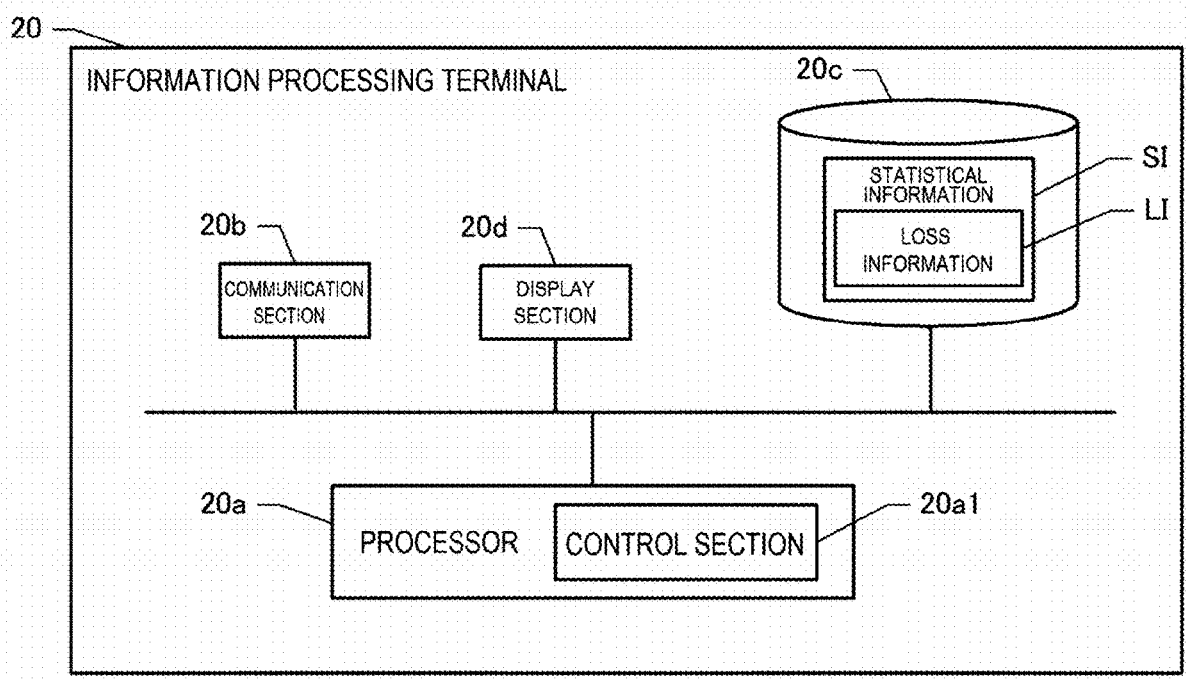
FIG. 7 is a block diagram showing the configuration of an information processing terminal.

In this embodiment, the information processing apparatus 10 collects statistics of history information according to each default trigger (for example, every fixed time or every occurrence of an information transmission request) and generates statistical information including loss information explained below. The information processing terminal 20 is a terminal such as a tablet terminal with which the statistical information generated by the information processing apparatus 10 can be viewed. That is, when a user of the information processing terminal 20 operates the information processing terminal 20 and performs a viewing request for the statistical information, the statistical information is transmitted from the information processing apparatus 10. The information processing terminal 20 receives the statistical information and causes a display section to display the statistical information. FIG. 7 shows an example of a screen displayed on the display section (details are explained below).

(1-1) Configuration of the Printer

Figure 2:
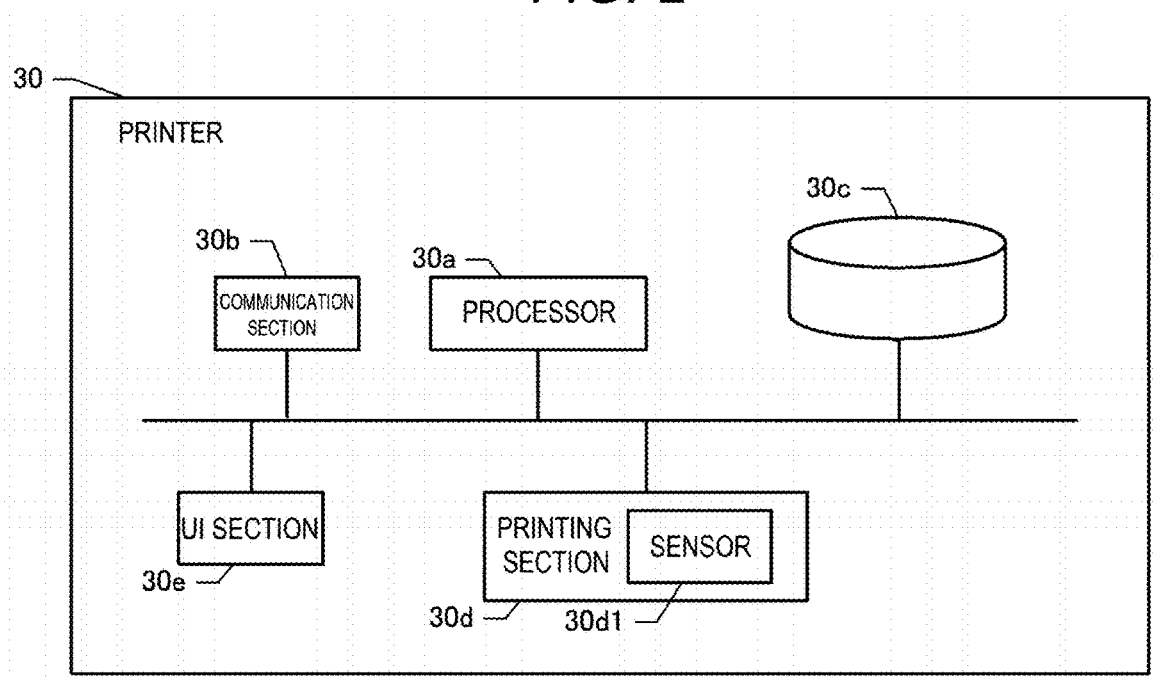
FIG. 2 is a block diagram showing the configuration of a printer.

FIG. 2 is a block diagram showing the configuration of the printer 30. The printer 30 includes a processor 30a, a communication section 30b, a nonvolatile memory 30c, a printing section 30d, and a UI section 30e. The processor 30a includes a CPU, a ROM, a RAM or the like not shown in FIG. 2. The processor 30a can execute various programs recorded in the nonvolatile memory 30c and control the sections of the printer 30. The processor 30a may be configured by a single chip or may be configured by a plurality of chips. For example, an ASIC may be adopted instead of the CPU or the CPU and the ASIC may cooperate.

The communication section 30b includes a communication interface for communicating with an external device according to wired or wireless various communication protocols. The communication section 30b includes an interface for communicating with various removable memories inserted into the printer 30. The printer 30 is capable of communicating with the mediating apparatus 40 via the communication section 30b.

In this embodiment, the printing section 30d includes an actuator, various devices, a sensor 30d1, a driving circuit, and machine components for executing printing on various printing media in various printing systems such as an inkjet system and an electrophotographic system. The sensor 30d1 includes a sensor that detects various detection targets that can change in the printer 30. Specifically, in this embodiment, the sensor 30d1 includes a temperature sensor, a humidity sensor, and an air pressure sensor. The printer 30 can detect, with the temperature sensor, the humidity sensor, and the air pressure sensor, temperature, humidity, and air pressure in a place where the printer 30 is set. These sensors are examples. Other detection targets may be detected by other sensors or at least a part of the sensors may be omitted.

The UI section 30e includes a touch panel display, various keys, and various switches. The touch panel display includes a display panel that displays various kinds of information based on control by the processor 30a and a touch detection panel placed on the display panel. The touch panel display detects touch operation by a human finger or the like. The processor 30a can acquire operation content of the user via the UI section 30e. The processor 30a can display various kinds of information on the display of the UI section 30e and notify the various kinds of information to the user.

In this embodiment, the user is capable of performing various settings by operating the UI section 30e. For example, the user is capable of designating a name of a printing medium used for printing and is capable of setting a state of the actuator in the printing executed using the printing medium. For example, when the printer 30 includes a heater for drying ink after printing, the user is capable of setting a heater temperature (a target temperature).

Various settings are possible in the actuator included in the printer 30 as well. For example, when adjustment of a platen gap for adjusting the distance between a printing medium and a carriage in a printing region is possible, it is possible to set an adjustment value corresponding to the distance. When the printer 30 uses a printing medium in a wound state like roll paper or the like, it is possible to adjust tension acting on the printing medium (media tension). These various adjustments are realizable by publicly-known various mechanisms. The user can perform various settings by operating the UI section 30e.

Naturally, a part of the various settings may be automatically performed. For example, when a printing media name is set, setting values adjusted to a printing medium may be automatically set for other setting items. In this case as well, setting of any items may be changeable. The printer 30 may read out a document, image data, or the like from a recording medium coupled to the printer 30 and execute a printing job or may execute a printing job instructed from a computer coupled to the printer 30. In the latter case, various setting may be specified by a printer driver executed by the computer.

In this embodiment, a plurality of printers 30 are set in a facility of a printing company. Printing can be carried out in parallel according to various printing requests received by the printing company. The printing company can own a plurality of facilities. A plurality of printers 30 can be set in each of the facilities. Further, a plurality of different printing companies can operate a plurality of printers 30 in a facility of each of the printing companies. In this embodiment, the printer 30 uses a printing medium in a wound state like roll paper.

In this embodiment, when executing a printing job, each of the printers 30 generates history information indicating a history of printing and transmits the history information to the mediating apparatus 40. Accordingly, in this embodiment, a not-shown history information transmission program is recorded. When the printing job is executed, the processor 30a executes transmission processing according to the history information transmission program.

FIG. 3 is a diagram showing an example of history information HI transmitted from the printer 30. In this embodiment, the history information HI is generated for each of printing jobs. The history information HI includes job information, error information, printing media setting information, and setting environment information. The job information is information for identifying the printing job and is a job ID for identifying the printing job in this embodiment. The processor 30a specifies the job ID based on predetermined rules and includes the job ID in the history information HI. Naturally, the job information may be information of other forms, for example, an execution date and time of the printing job.

The error information is information indicating a type of an error that occurred in a process of the printing job and is information indicating a history of errors of each of printing media. The processor 30a is capable of detecting an end of the printing job (for example, detecting that conveyance of a default amount of printing media is executed after a default amount of printing). When an error occurs in the printer 30 in the process of the printing, the processor 30a is capable of detecting the occurrence of the error and specifying a type of the error. That is, forms of errors are determined in advance and an error ID is given in advance for each of the forms of the errors such as a conveyance stop of printing media and a deficiency of ink ejection. The processor 30a is capable of detecting that errors of various forms have occurred. The processor 30a specifies an error ID corresponding to a form of a detected error and includes the error ID in the history information HI.

The printing media setting information is information concerning setting of a printing medium and indicates setting concerning a printing medium set by, for example, operation on the UI section 30e. Specifically, in this embodiment, the printing media setting information includes a printing media name, a printing media conveyance amount, a printing media residual amount, a printing media width, the size of a printing region, heater temperature setting, and mechanical parameters.

FIG. 4 is a diagram for explaining the printing media conveyance amount, the printing media width, and the size of the printing region, which are the information included in the printing media setting information. In FIG. 4, a printing medium MD in a wound state on a roll R is shown. An arrow AW indicates a direction in which the printing medium MD is wound off from the roll R, that is, a conveying direction of the printing medium MD. To explain with reference to FIG. 4, the printing media conveyance amount means length of the printing medium MD wound off in the direction of the arrow AW and is specified by a rotation amount of a roll (for example, the roll R or a nip roll) that conveys the printing medium MD. The printing media width means length WD of the printing medium MD in a direction orthogonal to the direction of the arrow AW. The printing region means a rectangular region occupied by printing data, which is a printing target, when the printing data is printed on the printing medium MD. In FIG. 4, the printing region is indicated as a broken-line rectangular region AR. The size of the printing region means an area of the rectangular region AR. The non-printing region means a region other than the printing region in the printing medium MD.

That is, when the printing job is executed, the processor 30a specifies a set printing media name and includes the printing media name in the history information HI. The processor 30a specifies a conveyance amount (length in a conveying direction) of a printing medium conveyed in printing by the printing job and acquires the conveyance amount as a printing media conveyance amount. The conveyance amount of the printing medium may be detected by a sensor, may be detected according to, for example, a rotation amount of a conveying roller, or may be various forms. In order to regard a non-printing region as a region not in use when the printing is stopped by an error, it is preferable to adopt a sensor or a form capable of specifying an actual amount of use such as a rotation amount of the conveying roller.

Further, the processor 30a specifies the printing media residual amount by subtracting the printing media conveyance amount from the printing media residual amount before the printing job starts and includes the printing media residual amount in the history information HI. The printing media residual amount before the printing job starts is recorded in the nonvolatile memory 30c. In the case of first printing after a start of accumulation of printing media in the printer 30, the printing media residual amount is an initial accumulation amount. Naturally, a unit of the printing media residual amount is optional and may be various units, for example, a percentage other than the length. A residual amount of a printing medium may be specified by a printing media residual amount sensor.

Further, the processor 30a specifies a printing media width (length in a direction orthogonal to the conveying direction) of the used printing medium and includes the printing media width in the history information HI. The printing media width may be specified by various methods. For example, it is possible to adopt a configuration in which printing media widths are associated with printing media names and recorded in the nonvolatile memory 30c in advance and the processor 30a acquires the printing media width. The printing media width may be detected by a sensor or the like.

Further, the processor 30a specifies the size of a printing region in a printing medium on which printing is performed and includes the size of the printing region in the history information. In this embodiment, the size of the printing region means an area. The size of the printing region may be specified by various methods. For example, it is possible to adopt a configuration in which the processor 30a acquires the size of the printing region based on an image size of printing data, which is a printing target, and a value of resolution applied to the printing. The size of the printing region may be specified from a ratio of a region occupied by the printing region in an entire printing product, which is the printing medium on which the printing data is printed.

Further, the processor 30a specifies a setting temperature for a heater for drying ink after printing and includes the setting temperature in the history information HI. Further, the processor 30a specifies mechanical parameters (a media tension, a platen gap, a printing media feeding amount, a drying time, and the like) of a mechanism of the printer 30 and includes the mechanical parameters in the history information HI.

The setting environment information is information concerning an environment that can affect printing media. The processor 30a acquires detection values of the temperature sensor, the humidity sensor, and the air pressure sensor included in the sensor 30d1. The processor 30a includes the detection values of temperature, humidity, and air pressure in the history information HI. When the printing job ends or is suspended by an error, the processor 30a generates the history information HI explained above. Further, the processor 30a transmits the history information HI to the mediating apparatus 40 via the communication section 30b.

(1-2) Configuration of the Mediating Apparatus

Figure 5:
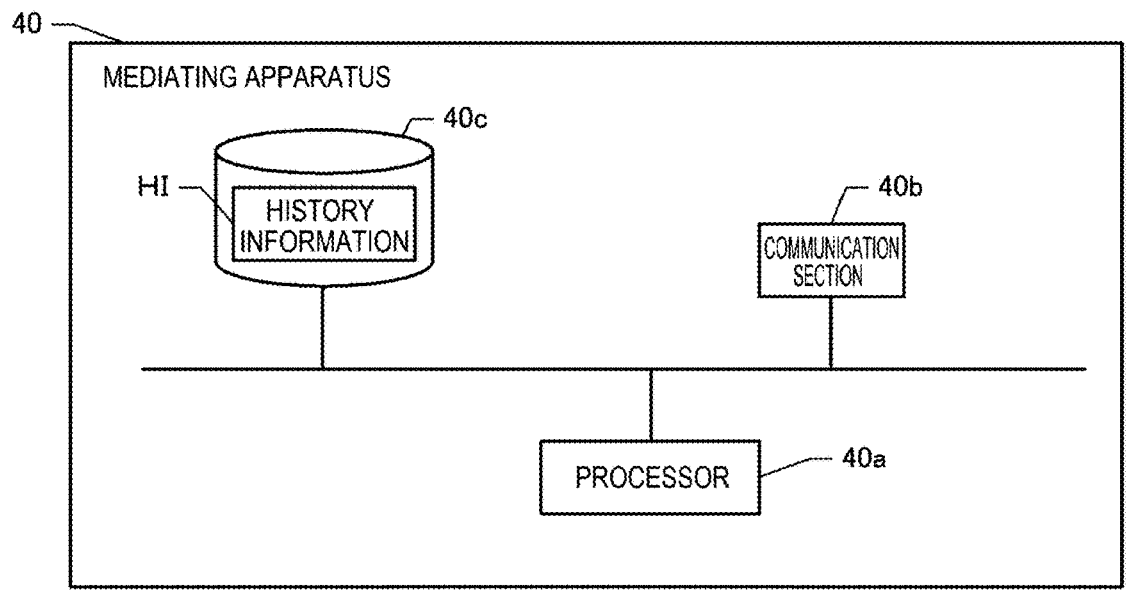
FIG. 5 is a block diagram showing the configuration of a mediating apparatus.

FIG. 5 is a block diagram showing the configuration of the mediating apparatus 40. The mediating apparatus 40 includes a processor 40a, a communication section 40b, and a nonvolatile memory 40c. The processor 40a includes a CPU, a ROM, a RAM or the like not shown in FIG. 5. The processor 40a can execute various programs recorded in the nonvolatile memory 40c and control the sections of the mediating apparatus 40. The processor 40a may be configured by a single chip or may be configured by a plurality of chips. An ASIC may be adopted instead of the CPU or the CPU and the ASIC may cooperate.

The communication section 40b includes a communication interface for communicating with an external device according to wired or wireless various communication protocols. The mediating apparatus 40 is capable of communicating with the printer 30 and the information processing apparatus 10 via the communication section 40*b*. In this embodiment, the processor 40*a* executes a not-shown information mediating program recorded in the nonvolatile memory 40*c*. When the information mediating program is executed, the processor 40*a* stays on standby for a transmission request for the history information HI to be output from the printer 30. When the transmission request is performed, the processor 40*a* acquires the history information HI from the printer 30, which performs the request, via the communication section 40*b* and records the history information HI in the nonvolatile memory 40*c*.

Further, the processor 40*a* transmits the history information HI to the information processing apparatus 10 via the communication section 40*b*. As a result, the information processing apparatus 10 accumulates the history information HI. Transmission timing of the history information HI may be various timings or may be every fixed period or the like. For example, a configuration may be adopted in which the mediating apparatus 40 outputs a transmission request for the history information HI to the printer 30 and the printer 30 transmits the history information HI in response to the transmission request.

(1-3) Configuration of the Information Processing Apparatus

Figure 6:
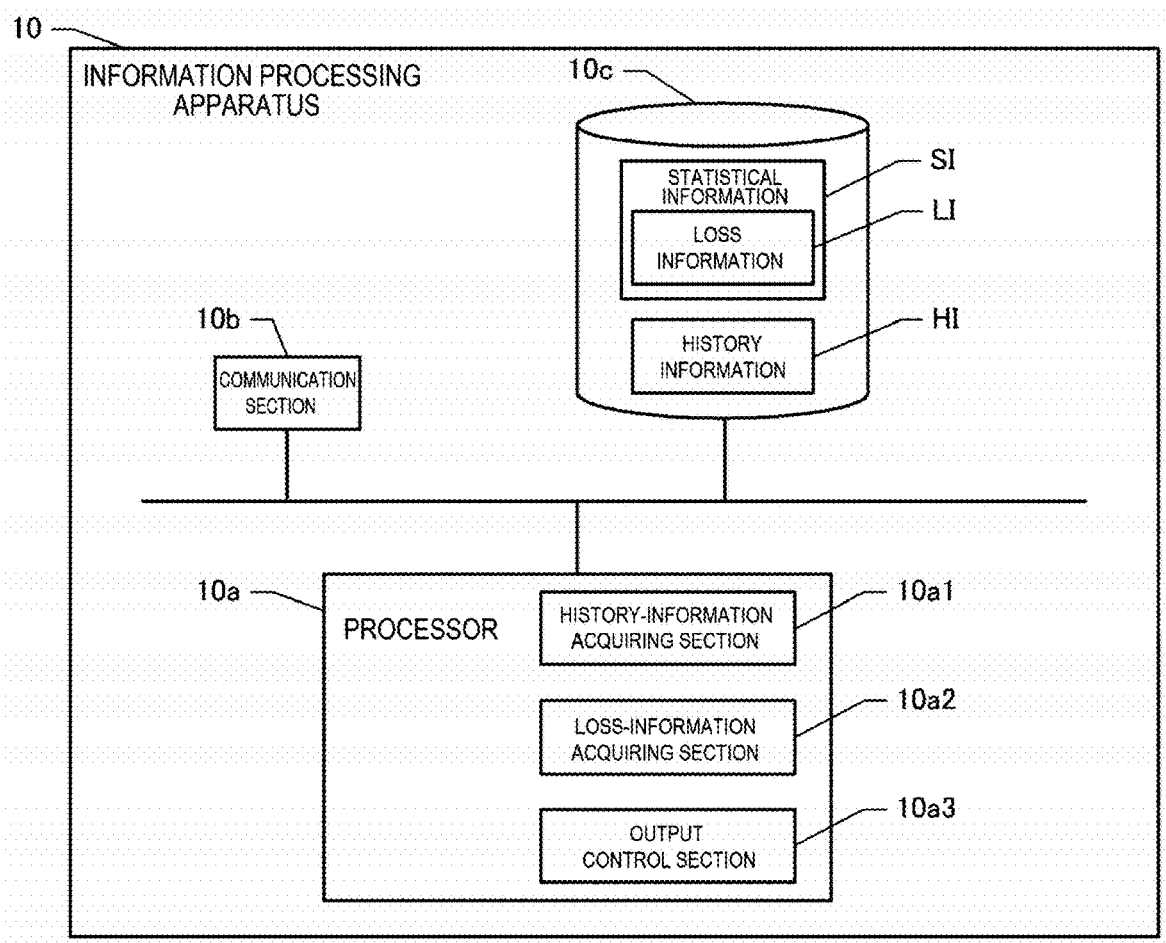
FIG. 6 is a block diagram showing the configuration of an information processing apparatus.

FIG. 6 is a block diagram showing the configuration of the information processing apparatus 10. The information processing apparatus 10 includes a processor 10*a*, a communication section 10*b*, and a nonvolatile memory 10*c*. The processor 10*a* includes a CPU, a ROM, a RAM or the like not shown in FIG. 6. The processor 10*a* can execute various programs recorded in the nonvolatile memory 10*c* and control the sections of the information processing apparatus 10. The processor 10*a* may be configured by a single chip or may be configured by a plurality of chips. An ASIC may be adopted instead of the CPU or the CPU and the ASIC may cooperate.

The communication section 10*b* includes a communication interface for communicating with an external device according to wired or wireless various communication protocols. The information processing apparatus 10 is capable of communicating with the mediating apparatus 40 and the information processing terminal 20 via the communication section 10*b*. The history information HI is collected from the plurality of printers 30 by the mediating apparatus 40 and transmitted to the information apparatus 10 to be recorded in the information processing apparatus 10. The information processing apparatus 10 can perform various analyses relating to the printer 30 by analyzing the history information HI.

In this embodiment, statistical information SI including loss information LI for supporting selection of printing media used in the printer 30 is acquired according to the analysis. Accordingly, the processor 10*a* executes a not-shown information processing program recorded in the nonvolatile memory 10*c*. When the information processing program is executed, the processor 10*a* functions as a history-information acquiring section 10*a*1, a loss-information acquiring section 10*a*2, and an output control section 10*a*3.

The history-information acquiring section 10*a*1 has a function of acquiring, from the plurality of printers 30, the history information HI indicating an amount of use of printing media used for printing in the printers 30 and the size of a printing region in the printing media on which the printing is performed. The history information HI indicating the amount of use of the printing media means a printing media conveyance amount and a printing media width. With the function of the history-information acquiring section 10*a*1, the processor 10*a* receives the history information HI from the mediating apparatus 40 via the communication section 10*b*. When the history information HI is acquired, with the function of the history-information acquiring section 10*a*1, the processor 10*a* records the history information HI in the nonvolatile memory 10*c*. Collection timing of the history information HI may be various timings or may be every fixed period or the like. For example, a configuration may be adopted in which a transmission request for the history information HI is performed from one of the mediating apparatus 40 and the information processing apparatus 10 and communication for exchange of the history information HI is performed in response to the transmission request.

The loss-information acquiring section 10*a*2 has a function of acquiring, based on the history information HI, the loss information LI indicating a non-printing region in each of printing media. With the function of the loss-information acquiring section 10*a*2, the processor 10*a* acquires the loss information LI for each of predetermined triggers (for example, every fixed period or loss information request time) based on the history information HI. That is, with the function of the loss-information acquiring section 10*a*2, the processor 10*a* refers to the printing media setting information included in the history information HI recorded in the nonvolatile memory 10*c* and acquires, for each of the printing media, information indicating a printing media use amount (a printing media conveyance amount and a printing media width) used for printing and information indicating the size of a printing region in the printing. The processor 10*a* associates these kinds of acquired information with names of the printing media. In this embodiment, the processor 10*a* acquires, as the loss information LI indirectly indicating a non-printing region in each of the printing media, the printing media conveyance amount and the printing media width for each of the printing media and the size of the printing region. In other embodiments, the processor 10*a* may include, in the loss information LI, and acquire, as information directly indicating the non-printing region in each of the printing media, a value obtained by subtracting a value indicating the size (the area) of the printing region from a value obtained by multiplying the printing media conveyance amount by the printing media width.

In this embodiment, the processor 10*a* calculates the number of job executions, the number of error executions, and an error occurrence rate based on the history information HI. That is, the processor 10*a* counts the number of printing jobs in which printing media having the same printing media name are used (the number of job IDs associated with the printing media having the same printing media name) and sets the number of printing jobs as the number of job executions. The processor 10*a* associates the number of job executions with the printing media name.

The processor 10*a* counts the number of error IDs associated with the printing media having the same printing media name and sets the number of error IDs as the number of errors. The processor 10*a* associates the number of errors with the printing media name. Further, the processor 10*a* acquires a value obtained by dividing the number of errors by the number of job executions as an error occurrence rate. The processor 10*a* associates the error occurrence rate with the printing media name. The processor 10*a* further associates the number of job executions, the number of errors, and the error occurrence rate with the loss information LI associated with each of the same printing media names from the history information HI, sets the number of job executions, the number of errors, and the error occurrence rate as the statistical information SI, and records the statistical information SI in the nonvolatile memory 10c.

The output control section 10a3 has a function of causing the display section to output loss information for each of printing media. With the function of the output control section 10a3, the processor 10a transmits the statistical information SI to the information processing terminal 20 via the communication section 10b in response to a transmission request for the statistical information SI from the information processing terminal 20. As a result, the statistical information SI including the loss information LI is output to (displayed on) a display section 20d included in the information processing terminal 20.

(1-4) Configuration of the Information Processing Terminal

FIG. 7 is a block diagram showing the configuration of the information processing terminal 20. The information processing terminal 20 includes a processor 20a, a communication section 20b, a nonvolatile memory 20c, and the display section 20d. The processor 20a includes a CPU, a ROM, a RAM or the like not shown in FIG. 7. The processor 20a can execute various programs recorded in the nonvolatile memory 20c and control the sections of the information processing terminal 20. The processor 20a may be configured by a single chip or may be configured by a plurality of chips. An ASIC may be adopted instead of the CPU or the CPU and the ASIC may cooperate.

The communication section 20b includes a communication interface for communicating with an external device according to wired or wireless various communication protocols. The information processing terminal 20 is capable of communicating with the information processing apparatus 10 via the communication section 20b. The display section 20d is a display that displays any image. The display section 20d according to this embodiment includes a touch panel functioning as an input section. Therefore, the processor 10a can acquire input content corresponding to operation on the touch panel of the display section 20d.

In this embodiment, the processor 20a executes a not-shown information processing program recorded in the nonvolatile memory 20c. When the information processing program is executed, the processor 20a functions as a control section 20a1. The control section 20a1 has a function of causing the display section to output, for each of printing media, the statistical information SI recorded in the nonvolatile memory 20c.

In this embodiment, the user of the information processing terminal 20 instructs a start of display of the statistical information SI with, for example, operation on the touch panel of the display section 20d. When the processor 20a receives the instruction with the function of the control section 20a1, with the function of the control section 20a1, the processor 20a outputs a transmission request for the statistical information SI via the communication section 20b. When the information processing apparatus 10 transmits the statistical information SI in response to the transmission request, with the function of the control section 20a1, the processor 20a receives the statistical information SI via the communication section 20b and records the statistical information SI in the nonvolatile memory 20c.

With the function of the control section 20a1, the processor 20a causes the display section 20d to display the statistical information SI including the loss information LI. FIG. 8 is a diagram showing a display example of the statistical information SI on the display section 20d. In the display example shown in FIG. 8, various kinds of information are shown in a list for each of printing media names in a lower part of FIG. 8. Information for each of the printing media names is indicated by a graph in an upper part of FIG. 8.

Specifically, a printing media name is shown in the leftmost row in the list shown in FIG. 8. A printing region, a printing media conveyance amount, a printing media width, the number of job executions, the number of errors, an error occurrence rate, and a printing media jam are shown in rows on the right of the printing media name. That is, the processor 20a controls the display section 20d to display, referring to the statistical information SI, in the list, numerical values of the printing region, the printing media conveyance amount, the printing media width, the number of job executions, the number of errors, and the error occurrence rate associated with the printing media names. Further, the processor 20a acquires, from the statistical information SI, the number of occurrences of a type of a specific error (the number of occurrences of the printing media jam in the example shown in FIG. 8) for each of the printing media names. The processor 20a controls the display section 20d to display, in the list, the printing media jam.

Further, the processor 20a generates a pie graph about one item of the information displayed in the list and controls the display section 20d to display the pie graph above the list. In the example shown in FIG. 8, the printing media conveyance amount for each of the printing media names is displayed as the pie graph. In the example shown in FIG. 8, specific items about a specific printing media name are written on the right side of the pie graph. That is, in the example shown in FIG. 8, the number of errors, an error occurrence rate, and the number of occurrences of the printing media jam of a printing medium having a printing media name "photographic paper (thin)" are displayed.

The expression, thick and thin, in the printing media names indicate thick printing media and thin printing media. In the list shown in FIG. 8, information concerning five kinds of printing media is shown. The list can be scrolled in the paper surface downward direction. Information concerning printing media of other kinds may be shown in the paper surface downward direction. Naturally, the printing media of the other kinds may include printing media having printing media widths different from 36 inches. FIG. 8 is a display example of the statistical information SI. Naturally, other items included in the statistical information SI may be displayed or at least a part of the items shown in FIG. 8 may not be displayed. Further, information (for example, an occurrence rate of an error of a specific type) processed based on the statistical information SI may be displayed. In this embodiment, as the loss information LI indirectly indicating a non-printing region in each of the printing media, the printing media conveyance amount and the printing media width (the printing media use amount) and the size of the printing region in each of the printing media are displayed. In the other embodiments, the processor 20a may acquire a value indicating the size (the area) of the non-printing region by subtracting a value indicating the size (the area) of the printing region from a value obtained by multiplying the printing media conveyance amount by the printing media width, include the value in the loss information LI as information directly indicating the non-printing region in each of the printing media, and cause the display section 20d to display the loss information LI.

The user can perform an instruction for changing display content with input operation to the display section 20d. The processor 20a changes the display content to content corresponding to the input operation. A form of the change may be various forms. For example, it may be possible to change items of display targets displayed as the pie graph. More specifically, for example, a configuration may be adopted in which the user selects the printing region with input operation to the display section 20d to thereby cause the display section 20d to display a pie graph of the printing region for each of the printing media names. Naturally, a form of a graph is not limited to the pie graph. Further, sorting may be possible in the list. For example, a configuration may be adopted in which the user instructs, with input operation to the display section 20d, an item and ascending order (or descending order) serving as keys in the sorting, whereby a list is displayed using any items as keys.

According to this embodiment explained above, the loss information indicating the non-printing region in each of the printing media is output to the display section. Accordingly, by grasping a loss for each of the printing media involved in the execution of the printing jot, the user can examine measures for improving a profit. By grasping the loss for each of the printing media, accuracy of prediction of timing when the printing media are out of stock is improved. Therefore, it is possible to reduce possibility of occurrence of the stock-out of the printing media. That is, a period in which the printer cannot operate because of the stock-out of the printing media less easily occurs. Therefore, the grasping of the loss for each of the printing media contributes to improvement of an operation rate of the printer as well.

(2) History Information Transmission Processing

Figure 9:
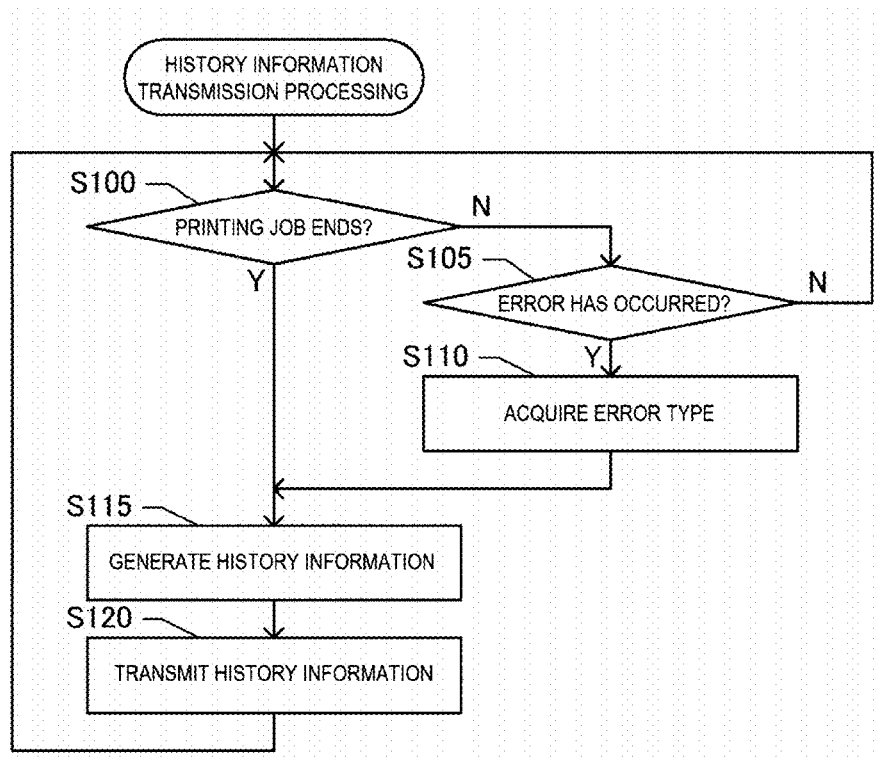
FIG. 9 is a flowchart of history information transmission processing.

FIG. 9 is a flowchart showing history information transmission processing executed by the processor 30a. The history information transmission processing is executed when the printer 30 is started. When the history information transmission processing is executed, the processor 30a determines whether a printing job ends (step S100). That is, the processor 30a executes the history information transmission processing until an end command for the printing job and determines that the printing job ends when processing by commands are carried out to the last.

When not determining in step S100 that the printing job ends, the processor 30a determines whether an error has occurred (step S105). That is, the processor 30a regards that an error has occurred when not all of kinds of processing up to the end command of the printing job are executed to the last and the printing stops. When not determining in step S105 that an error has occurred, the processor 30a repeats the processing in step S100 and subsequent steps.

When determining in step S105 that an error has occurred, the processor 30a acquires a type of the error based on states of the sections of the printing section 30d (step S110). When determining in step S100 that the printing job ends or when acquiring the error type in S110, the processor 30a generates the history information HI concerning a printing job that was just started to be executed (step S115). That is, the processor 30a generates a job ID and associates the job ID with the history information HI. The processor 30a refers to setting during the execution of the printing job, acquires a printing media name, a printing media width, size of a printing region, heater temperature setting, and mechanical parameters, and associates the printing media name, the printing media width, the size of the printing region, the heater temperature setting, and the mechanical parameters with the history information HI.

Further, the processor 30a specifies a printing media conveyance amount based on a conveyance amount (length in a conveying direction) of a printing medium conveyed in printing by the printing job. The processor 30a specifies a printing media residual amount based on the printing media conveyance amount. The processor 30a associates the printing media conveyance amount and the printing media residual amount with the history information HI. Further, the processor 30a acquires temperature, humidity, and air pressure of a setting environment of the printer 30 based on an output of the sensor 30d1 and associates the temperature, the humidity, and the air pressure with the history information HI.

Further, when step S115 is executed through step S110, the processor 30a further associates error information with the history information HI. That is, the processor 30a associates an error ID corresponding to the type of the error acquired in step S110 with the history information HI.

Subsequently, the processor 30a transmits the history information HI (step S120). That is, the processor 30a outputs a transmission request to the mediating apparatus 40 via the communication section 30b. When the mediating apparatus 40 responds to the transmission request, the processor 30a transmits the history information HI to the mediating apparatus 40 via the communication section 30b. Thereafter, the processor 30a repeats the processing in step S100 and subsequent steps. In the mediating apparatus 40, the processor 40a transmits the history information HI to the information processing apparatus 10 via the communication section 40b at default timing. At this time, after transmitting the history information HI to the information processing apparatus 10 last time, the mediating apparatus 40 transmits the history information HI acquired anew to the information processing apparatus 10. As a result, the information processing apparatus 10 can collect the history information HI of a history of each of printing jobs executed in each of the plurality of printers 30.

(3) Information Output Processing

Figure 10:
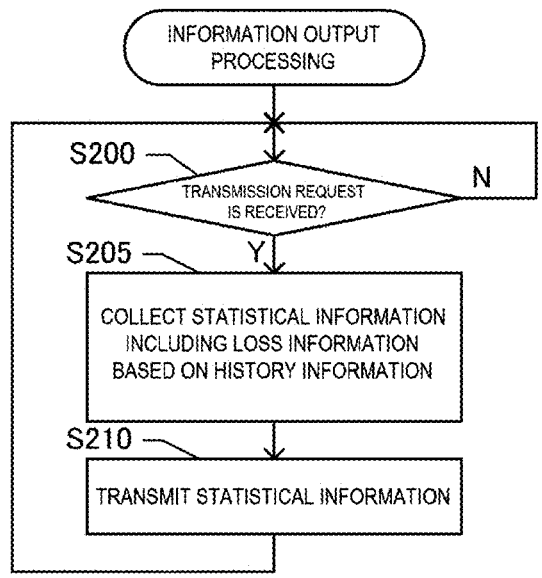
FIG. 10 is a flowchart of information output processing.

FIG. 10 is a flowchart showing information output processing executed by the processor 10a. The information output processing is executed in a state in which the history information HI is recorded in the nonvolatile memory 10c of the information processing apparatus 10. In the information processing terminal 20, when the user instructs a start of display of the statistical information SI with, for example, operation on the touch panel of the display section 20d, the processor 20a transmits a transmission request for the statistical information to the information processing apparatus 10 via the communication section 20b.

With the function of the loss-information acquiring section 10a2, the processor 10a monitors, via the communication section 10b, whether the transmission request is received (step S200). When determining in step S200 that the transmission request is received, the processor 10a collects the statistical information SI including the loss information LI based on the history information HI (step S205).

That is, with the function of the loss-information acquiring section 10a2, the processor 10a carries out, for each of printing media names, processing for referring to the printing media setting information included in the history information HI recorded in the nonvolatile memory 10c, extracting information (the printing media conveyance amount and the printing media width and the size of the printing region) associated with the same printing media name, converting the information into information associated with the printing media name, and acquiring the loss information LI for each of the printing media names. Further, the processor 10a calculates the number of job executions, the number of error executions, and an error occurrence rate for each of the printing media names and associates the calculated various kinds of information with the loss information LI according to the printing media name to thereby acquire the statistical information SI.

Subsequently, with the function of the output control section 10a3, the processor 10a transmits the statistical information SI (step S210). That is, the processor 10a transmits the statistical information SI to the information processing terminal 20 via the communication section 10b. When the information processing terminal 20 receives the statistical information SI, the processor 20a controls the display section 20d to display the statistical information SI. As a result, display of the statistical information SI shown in FIG. 8 is performed.

(4) Other Embodiments

The embodiment explained above is an example for carrying out the present disclosure. Other various embodiments are adoptable. For example, in the embodiment explained above, the mediating apparatus 40 collects history information and transmits the history information to the information processing apparatus 10. However, the history information may be directly transmitted from the printer 30 to the information processing apparatus 10 not via the mediating apparatus 40. In the embodiment explained above, the history information is recorded and statistical information including loss information is generated in the information processing apparatus 10. However, at least apart of these kinds of processing may be carried out in the information processing terminal 20. Further, display of the statistical information may be performed in the display section included in the information processing apparatus 10.

Further, a form of the information processing terminal 20 is not limited to the tablet terminal and may be another portable terminal or may be a stationary terminal. The function of the information processing terminal 20 may be incorporated in the information processing apparatus 10 or the mediating apparatus 40.

The history-information acquiring section only has to be able to acquire, from a plurality of printers, history information indicating amounts of use of printing media used for printing in the printers and size of a printing region in the printing media on which the printing is performed. That is, the history-information acquiring section only has to be able to acquire history information that associates amounts of use of printing media used when being actually printed in the plurality of printers and size of a printing region in the printing media on which the printing is performed. The history information is information based on which statistics of a loss (an amount of anon-printing region) for each of printing media are collected and includes information indicating at least a correspondence relation between the amounts of the non-printing regions and the printing media. A form of the information indicating the printing media may be various forms. Examples of the form of the information include identification information (an ID, a name, or the like) of the printing media.

The printing media are used in a printer and are targets on which printing is performed. Therefore, the printing media are not limited to paper. All printable targets such as cloth and various kinds of resin can be the printing media. The printing media may be defined by identification information (an ID, a name, or the like) of the printing media.

The printing media can be defined in various forms. For example, the printing media may be defined by classifying types of the printing media according to characteristics (materials of the printing media themselves, types of coat materials, thicknesses, supply forms, and the like) of the printing media. The printing media may be defined by classifying types of the printing media according to uses (photograph printing, character printing, poster printing, and the like) of the printing media. Further, the printing media may be defined by classifying the types of the printing media according to manufacturers of the printing media. Naturally, the printing media may be defined by a combination of these definitions.

The loss-information acquiring section only has to be able to acquire, based on the history information, loss information indicating the non-printing region in each of the printing media. That is, the loss-information acquiring section only has to be able to acquire, as the loss information, at least information concerning the number of losses (an amount of the non-printing region) for each of the printing media.

The output control section only has to be able to cause the display section to output the statistical information including the loss information for each of the printing media. That is, the output control section only has to be able to output the statistical information for each of the printing media to the display section visually recognized by a person involved in the selection of printing media. The display section may be an apparatus integral with the information processing apparatus or may be another apparatus. As in the embodiment explained above, the display section and the information processing apparatus may be set in physically separated positions or may be set in near positions (for example, in the same room).

The loss information only has to be able to enable the user to grasp a loss for each of the printing media. An output form of the loss information is not limited to the form in the embodiment explained above. For example, a display form on a screen is not limited to the form in the embodiment explained above and may be output by voice or the like. The display section is not limited to a typical display and may be any display section such as an HMD (Head Mounted Display).

In the embodiment explained above, the loss information acquired by the loss-information acquiring section is the information indicating the non-printing region in each of the printing media. However, the embodiments of the present disclosure are not limited to this. The loss-information acquiring section may calculate information concerning cost of the printing region and acquire the information as the loss information. The cost of the non-printing region can include money cost or time cost consumed for the non-printing region that occurs when a printing job is executed to produce a printing product. The money cost includes non-printing loss cost and disposal loss cost explained below. The time cost includes an operation time of an apparatus relating to execution of a printing job such as a printer. With such an information processing apparatus, it is possible to inform the user of information concerning cost based on the non-printing region. Accordingly, the user can examine measures corresponding to a degree of the cost.

Figure 11:
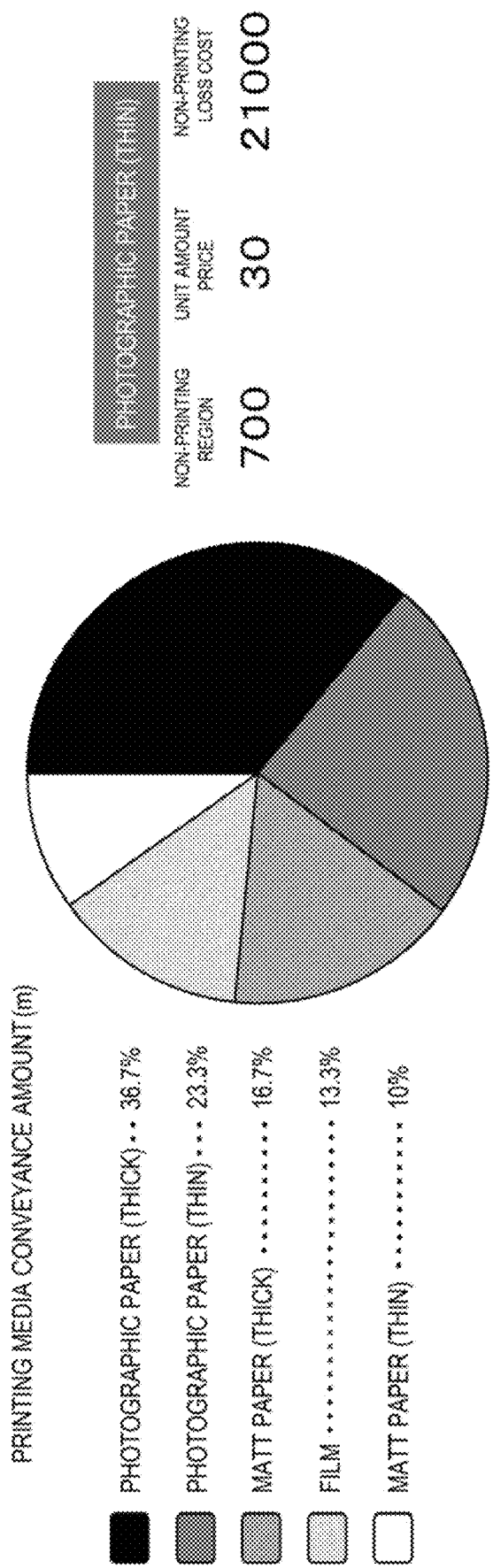
FIG. 11 is a diagram showing a display example of statistical information.

As the information concerning the cost of the non-printing region, the loss-information acquiring section may calculate cost including non-printing loss cost obtained by multiplying a difference between an amount of use of printing media and size of a printing region in the printing media by a price per unit amount of the printing media. The amount of use of the printing media means a value obtained by multiplying a printing media conveyance amount by a printing media width. The history information distinguishes and includes a printing media conveyance amount in the case in which a printing job is normally executed without an error and a printing media conveyance amount in the case in which the printing job is not normally executed because of an error and printing is stopped. For the calculation of the amount of use of the printing media, the printing media conveyance amount in the case in which the printing job is normally executed without an error is used. The difference can be regarded as a size (an area) of a non-printing region. The unit amount of the printing media means a unit area and means, for example, 1 square meter. The price per unit amount of the printing media may be specified by various method. For example, the price per unit amount may be associated with a printing media name and recorded in the nonvolatile memory in advance. The price per unit amount of the printing media may be input to the input section included in the display section of the information processing terminal by the user. The price may be recorded in the nonvolatile memory of the information processing apparatus from the information processing terminal. In such an information processing apparatus, with the function of the loss-information acquiring section, the processor refers to the printing media setting information included in the history information and acquires, for each of the printing media, information indicating a printing media use amount used for printing (a printing media conveyance amount and a printing media width in the case in which the printing job is normally executed) and information indicating the size of a printing region in the printing. The processor calculates a difference between a value obtained by multiplying, by the printing media width, the printing media conveyance amount in the case in which the printing job is normally executed and a value indicating the size of the printing region, that is, an area indicating the size of the non-printing region and multiplies the area by the price per unit amount of the printing media recorded in the nonvolatile memory to acquire a value of non-printing loss cost. Information concerning the calculated non-printing loss cost is included in statistical information and output to (displayed on) the display section included in the information processing terminal. FIG. 11 is a diagram showing a display example in which the information concerning the non-printing loss cost is included in the statistical information displayed on the display section. In a list shown in FIG. 11, a printing media name is shown in the leftmost row. A printing region, a printing media use amount, a non-printing region, a unit amount price, and non-printing loss cost are shown in rows on the right of the printing media name. With such an information processing apparatus, the user can examine measures corresponding to a degree of the non-printing loss cost. For example, when examining use of one of two kinds of printing media, by grasping the non-printing loss cost per unit amount of the respective printing media, the user can use the non-printing loss cost as a reference about which of the printing media should be selected. The loss information may include, besides the non-printing loss cost, as the money cost, electric energy for rotating a conveying roller in order to convey a printing medium by an area indicating the size of the non-printing region.

Figure 12:
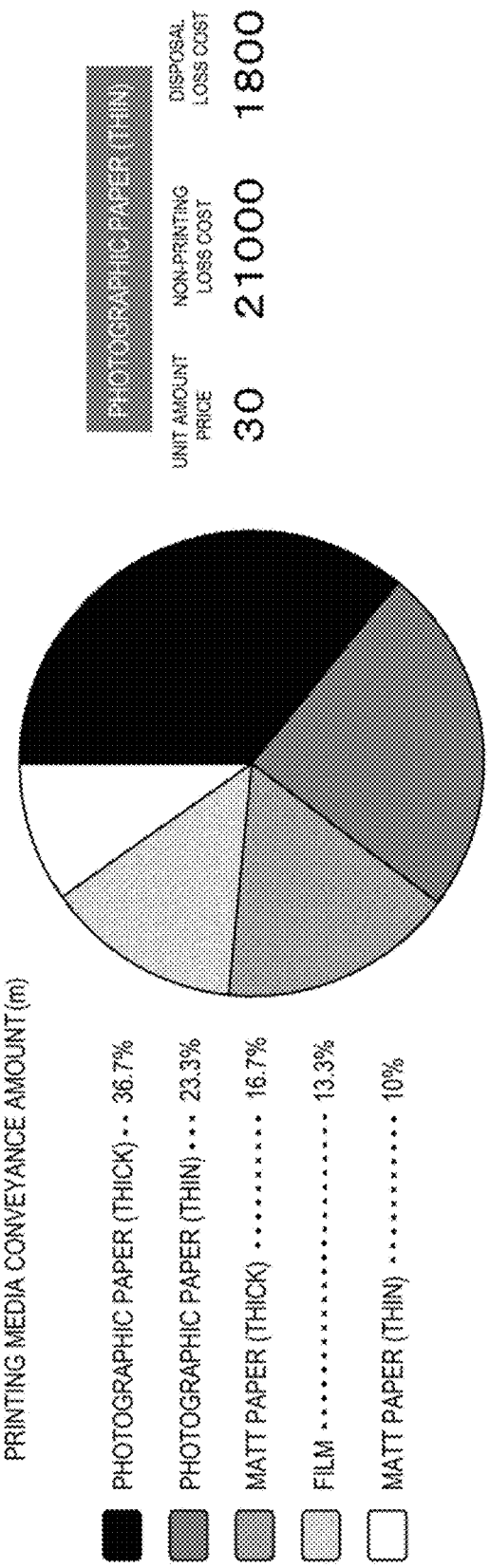
FIG. 12 is a diagram showing a display example of statistical information.

As the information concerning the cost of the non-printing region, the loss-information acquiring section may calculate cost including a sum of disposal loss cost obtained by multiplying an amount of use of printing media unprintable because of an error by a price per unit amount of the printing media and the non-printing loss cost. The amount of use of the printing media unprintable because of the error may be specified by various methods. For example, a printing media conveyance amount in the case in which a printing job is not normally executed because of an error and printing is stopped may be specified based on history information. The amount of use of the unprintable printing medium may be specified by multiplying the conveyance amount by a printing media width. Information concerning the amount of use of the printing media unprintable because of the error is associated with the history information. In such an information processing apparatus, with the function of the loss-information acquiring section, the processor refers to the history information and acquires, for each of printing media, an area indicating the amount of use of the printing media unusable because of the error. The processor multiplies the area indicating the amount of use of the printing media unusable because of the error by the price per unit amount of the printing media recorded in the nonvolatile memory and acquires a value of disposal loss cost. Information concerning the disposal loss cost calculated by such a process and the non-printing loss cost calculated by the process explained above is included in statistical information and output to (displayed on) the display section included in the information processing terminal. FIG. 12 is a diagram showing a display example in which information concerning the disposal loss cost and the non-printing loss cost is included in the statistical information displayed on the display section. In a list shown in FIG. 12, a printing media name is shown in the leftmost row. A printing region, a normal use amount explained below, a non-printing region, an error use amount explained below, a unit amount price, non-printing loss cost, and disposal loss cost are shown in rows on the right of the printing media name. The normal use amount is a value obtained by multiplying a printing media conveyance amount in the case in which a printing job is normally executed without an error by a printing media width (equivalent to a printing medium use fee shown in FIG. 11). The error use amount is a value obtained by multiplying, by a printing media width, a printing media conveyance amount in the case in which the printing job is not normally executed because of an error and printing is stopped. With such an information processing apparatus, the user can examine measures corresponding to a degree of the disposal loss cost and a degree of the non-printing loss cost. For example, when examining use of one of two kinds of printing media, by grasping the disposal loss cost and the non-printing loss cost per unit amount of the respective printing media, the user can set the disposal loss cost and the non-printing loss cost as a reference about which of the printing media should be selected.

The information concerning the cost of the non-printing region may include, as information concerning time cost, an operation time of an apparatus relating to execution of a printing job such as a printer. As the operation time of the apparatus, an operation time per unit amount may be associated with the printing media name and recorded in the nonvolatile memory in advance. An operation time per unit amount of a printing media may be input by the user to the input unit included in the display section of the information processing terminal. The operation time may be recorded in the nonvolatile memory of the information processing apparatus from the information processing terminal. The processor of the information processing apparatus multiplies an area indicating the size of a non-printing area or an area indicating the amount of use of a printing medium unprintable because of an error by the unit amount of the printing media recorded in the nonvolatile memory to acquire a value of time cost consumed for the non-printing region. Information concerning the time cost calculated by such a process may be included in statistical information and output to (displayed on) the display section included in the information processing terminal.

The error only has to be defined such that statistics of errors for each of the printing media contribute to selection of a printing medium. For example, a failure in printing in which the printing media are wasted (a state in which a printing result is not a printing product) because printing is executed but image quality or the like does not satisfy a fixed standard of the printing product may be included in history information as a history of errors for each of the printing media. At this time, it is assumed that the history information includes a printing media conveyance amount in the case in which the printing result does not satisfy the fixed standard of the printing product. Occurrence of such a failure in printing may be specified by a nozzle-abnormality detecting section detecting nozzle ejection failure in which ink is not ejected from a nozzle or may be specified by an input from the user who confirms that the standard is not satisfied. When such an error is included in the history information, the loss-information acquiring section may calculate cost including a sum of disposal loss cost obtained by multiplying an amount of use of printing media not satisfying the standard because of an error by a price per unit amount of the printing media and the non-printing loss cost. An event in which a printing medium is not wasted but printing is suspended and reprinting is necessary may be regarded as an error or may not be regarded as an error. Presence or absence of an error only has to be measured for each default unit. For example, the presence or absence of an error may be defined for each of printing jobs or may be defined for each printing on a printing medium having a fixed length.

Further, the loss information acquired by the loss-information acquiring section may include a loss occurrence rate obtained by dividing a difference between an amount of use of printing media and the size of a printing region in the printing media by the amount of use of the printing media. The amount of use of the printing media means a value obtained by multiplying the printing media conveyance amount by the printing media width. The difference can be regarded as the size (an area) of a non-printing region. The loss information including the loss occurrence rate is included in the statistical information and output to (displayed on) the display section included in the information processing terminal. With such an information processing apparatus, the user can examine measures corresponding to a degree of the loss occurrence rate.

Further, the statistical information may be used for proposal of improvement of various elements in a printing job. For example, with the function of the output control section 10a3, the processor 10a may cause the display section 20d to display a proposal for a change to printing media with which at least one of the non-printing loss cost and the disposal loss cost decreases. Accordingly, with the function of the output control section 10a3, the processor 10a compares, based on the statistical information SI, the loss information LI for each of the printing media names and specifies printing media that should be changed. For example, the processor 10a compares roll papers, specifies, for example, a case in which possibility of occurrence of the non-printing loss cost changes because of the width of the roll paper or a case in which a jam easily occurs and possibility of occurrence of the disposal loss cost changes depending on characteristics of a printing media and the printer 30, and causes the display section 20d to display printing media with which at least one of the printing loss cost and the disposal loss cost is estimated to be lower.

Further, the present disclosure is also applicable as a program executed by a computer or a method. The system, the program, and the method described above are sometimes realized as an independent apparatus or sometimes realized using components included in a plurality of apparatuses and include various forms. The system, the program, and the method can be changed as appropriate, for example, a part thereof is software and a part thereof is hardware. Further, the present disclosure is realized as a recording medium for a program for controlling the system. Naturally, the recording medium for the program may be a magnetic recording medium or may be a semiconductor memory. All recording media to be developed in future can be considered completely the same.

What is claimed is:

1. An information processing apparatus comprising:
a history-information acquiring section configured to acquire, from a plurality of printers, history information indicating an amount of use of printing media used for printing in the printers and size of a printing region in the printing media on which the printing is performed;
a loss-information acquiring section configured to acquire, based on the history information, loss information indicating a non-printing region in each of the printing media, and the loss-information acquiring section calculates information concerning cost of the non-printing region and acquires the information as the loss information and the cost includes non-printing loss cost that is obtained by multiplying a difference between the amount of use of the printing media and the size of the printing region in the printing media by a price per unit amount of the printing media; and
an output control section configured to cause a display section to output the loss information for each of the printing media.

2. The information processing apparatus according to claim 1, wherein the history information includes a history of errors for each of the printing media, and the loss-information acquiring section calculates the cost including a sum of disposal loss cost obtained by multiplying an amount of use of the printing media unprintable because of the error by the price per unit amount of the printing media and the non-printing loss cost.

3. The information processing apparatus according to claim 1, wherein the history information includes, as a history of errors for each of the printing media, a history in a case in which printing is executed but a standard of a printing product is not satisfied, and the loss-information acquiring section calculates the cost including a sum of disposal loss cost obtained by multiplying an amount of use of the printing media not satisfying the standard because of the error by the price per unit amount of the printing media and the non-printing loss cost.

4. The information processing apparatus according to claim 1, wherein the loss-information acquiring section acquires the loss information including a loss occurrence rate obtained by dividing a difference between an amount of use of the printing media and the size of the printing region in the printing media by the amount of use of the printing media.

5. A non-transitory computer-readable storage medium storing an image processing program for causing a computer to function as:
a history-information acquiring section configured to acquire, from a plurality of printers, history information indicating an amount of use of printing media used for printing in the printers and size of a printing region in the printing media on which the printing is performed;

a loss-information acquiring section configured to acquire, based on the history information, loss information indicating a non-printing region in each of the printing media, and the loss-information acquiring section calculates information concerning cost of the non-printing region and acquires the information as the loss information and the cost includes non-printing loss cost that is obtained by multiplying a difference between the amount of use of the printing media and the size of the printing region in the printing media by a price per unit amount of the printing media; and an output control section configured to cause a display section to output the loss information for each of the printing media.

6. An information processing method comprising:

acquiring, from a plurality of printers, history information indicating an amount of use of printing media used for printing in the printers and size of a printing region in the printing media on which the printing is performed;

acquiring, based on the history information, loss information indicating a non-printing region in each of the printing media, and the loss-information includes information concerning cost of the non-printing region and the cost includes non-printing loss cost that is obtained by multiplying a difference between the amount of use of the printing media and the size of the printing region in the printing media by a price per unit amount of the printing media; and causing a display section to output the loss information for each of the printing media.

7. A non-transitory computer-readable storage medium storing an image processing program for causing a computer to function as:

a history-information acquiring section configured to acquire, from a plurality of printers, history information indicating an amount of use of printing media used for printing in the printers and size of a printing region in the printing media on which the printing is performed;

a loss-information acquiring section configured to acquire, based on the history information, loss information indicating a non-printing region in each of the printing media and the loss information includes a loss occurrence rate that is obtained by dividing a difference between an amount of use of the printing media and the size of the printing region in the printing media by the amount of use of the printing media; and an output control section configured to cause a display section to output the loss information for each of the printing media.

* * * * *